(12) United States Patent
Chang (10) Patent No.: US 6,453,943 B1
(45) Date of Patent: Sep. 24, 2002

(54) FAUCET ASSEMBLY

(75) Inventor: Ta-Chun Chang, Taichung Hsien (TW)

(73) Assignee: Globe Union Industrial Corporation (TW)

( * ) Notice: Subject to any disclaimer, the term of this patent is extended or adjusted under 35 U.S.C. 154(b) by 0 days.

(21) Appl. No.: 09/880,894

(22) Filed: Jun. 15, 2001

(51) Int. Cl.⁷ ............................................... E03C 1/04
(52) U.S. Cl. ...................................... 137/597; 137/876
(58) Field of Search ............................ 137/597, 625.17, 137/876

(56) References Cited

U.S. PATENT DOCUMENTS

| | | | | |
|---|---|---|---|---|
| 1,856,380 A | * | 5/1932 | Foster | 137/597 |
| 4,095,610 A | * | 6/1978 | Priesmeyer | 137/100 |
| 4,979,530 A | * | 12/1990 | Breda | 137/597 |
| 5,193,582 A | * | 3/1993 | Antoniello et al. | 137/625.14 |
| 5,730,184 A | * | 3/1998 | Monch | 137/597 |

\* cited by examiner

*Primary Examiner*—Stephen M. Hepperle
(74) *Attorney, Agent, or Firm*—Foley & Lardner (57) ABSTRACT

A faucet assembly includes a water mixing chamber for receiving water from hot and cold water inflow passages, a transit chamber in fluid communication with the water mixing chamber, and a flow direction controlling body with a communicating port disposed downstream of the transit chamber, and two outflow ports respectively communicating with two outlets. A valve has a bottom wall facing toward and in sliding contact with and rotatable relative to the flow direction controlling body, and an annular wall with a first passage in fluid communication with the communicating port. The bottom wall has a second passage rotatable to communicate with one of the outflow ports.

7 Claims, 8 Drawing Sheets

FAUCET ASSEMBLY

BACKGROUND OF THE INVENTION

1. Field of the Invention

This invention relates to a faucet assembly, more particularly to a faucet assembly with a valve which controls flow of water in a water mixing chamber to one of two outflow ports.

2. Description of the Related Art

Figure 1:
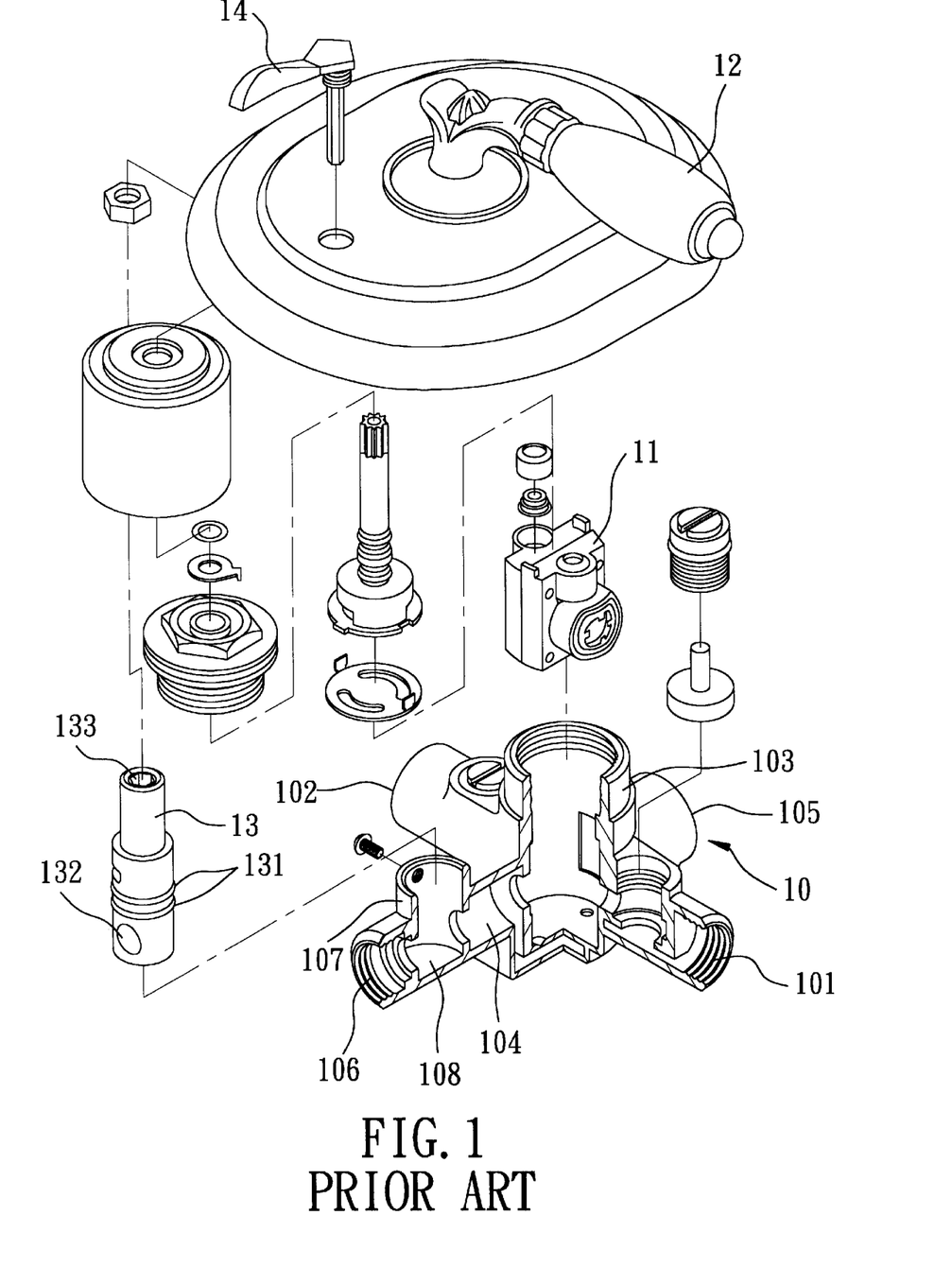
FIG. 1 is an exploded perspective view of a conventional faucet assembly.
Figure 2:
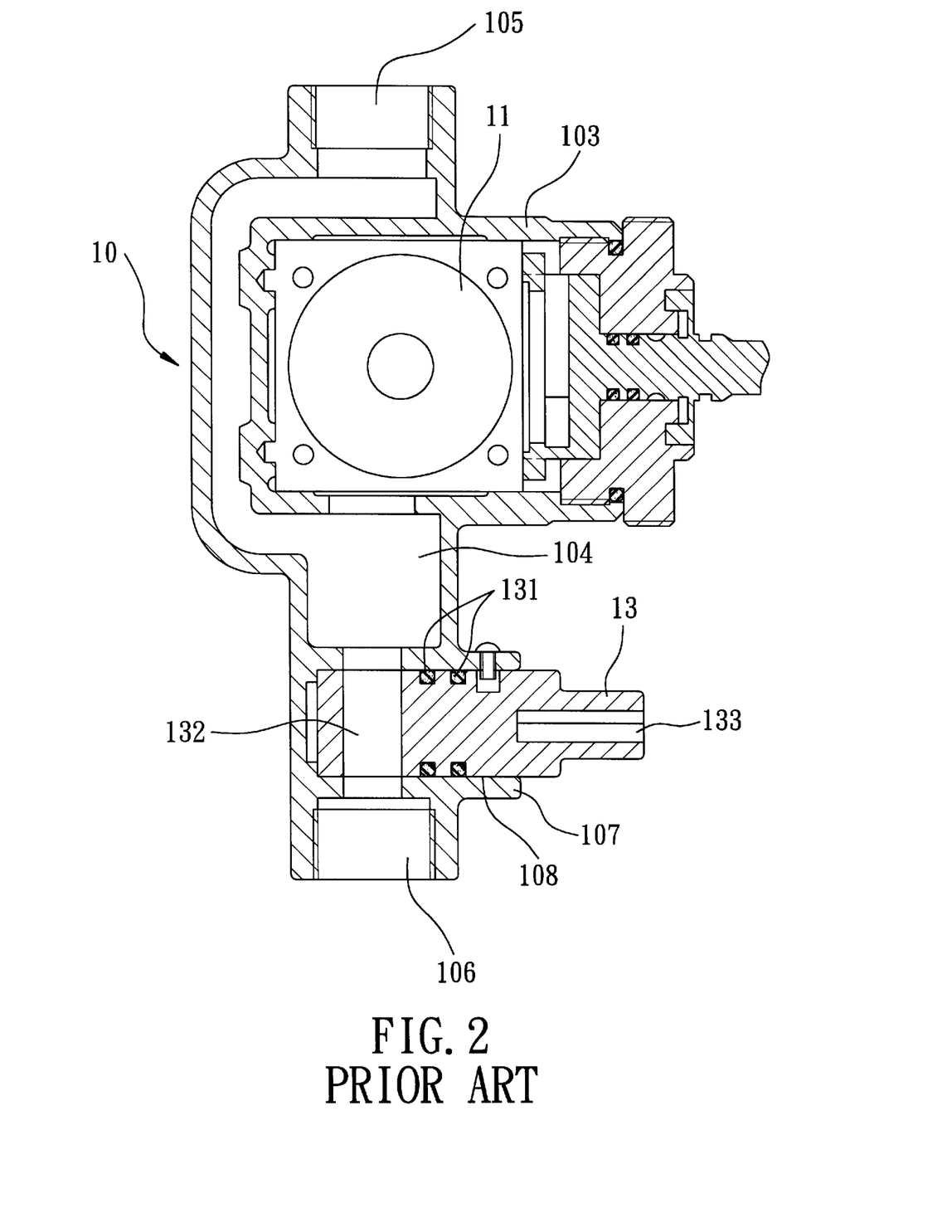
FIG. 2 is a cross-sectional view of the conventional faucet assembly.

Referring to FIGS. 1 and 2, a conventional faucet assembly is shown to include a faucet body 10 which has a water mixing chamber 103 for introducing hot and cold water from hot and cold water inflow passages 101,102. A primary valve 11 is disposed in the water mixing chamber 103, and extends in an axial direction to connect with a handle 12 so as to be rotatable to control the flow of the mixed water formed in the water mixing chamber 103 into an accommodating cavity 104 which is in fluid communication with the water mixing chamber 103. The accommodating cavity 104 is further in fluid communication with first and second outlets 105,106, such as a faucet spout and a showerhead. A flow direction controlling body 108 is disposed downstream of the water mixing chamber 103 and upstream of the second outlet 106. The flow direction controlling body 108 has an annular wall 107 which extends in the axial direction such that a secondary valve 13 is disposed sealingly and rotatably in the flow direction controlling body 108 by means of seal rings 131. A handle 14 has a spline connection with an outer portion 133 of the valve 13 to actuate rotation of the secondary valve 13. The valve 13 has a through hole 132 which extends radially and which is rotatable to communicate the accommodating cavity 104 with the second outlet 106 so as to permit the mixed water to flow out from the second outlet 106. When the through hole 132 is rotated so as not to register with the second outlet 106, the mixed water will flow out from the first outlet 105.

However, a clearance arises between the outer surrounding wall of the valve 13 and the inner peripheral wall of the flow direction controlling body 22, thereby resulting in dripping at the second outlet 106.

SUMMARY OF THE INVENTION

The object of the present invention is to provide a faucet assembly which can overcome the aforementioned problem commonly associated with the prior art.

According to this invention, the faucet assembly comprises a water mixing chamber which includes first front and rear inner walls facing towards and spaced apart from each other in an axial direction to define an accommodating space for receiving water. The first rear inner wall has hot and cold water inlets which are disposed to introduce hot and cold water flows into the accommodating space, and which can communicate with hot and cold water inflow passages, respectively. A transit chamber is in fluid communication with and downstream of the water mixing chamber. A valve assembly is disposed downstream of the mixing chamber and upstream of the transit chamber, and includes a primary valve with first and second valve portions. The first valve portion is disposed in the water mixing chamber, and is rotatable relative to the first rear inner wall about a first axis oriented in the axial direction to control the flows of hot and cold waters into the water mixing chamber via the hot and cold water inlets, respectively. The second valve portion is disposed between the water mixing chamber and the transit chamber to control the flow of mixed water formed in the water mixing chamber into the transit chamber. The valve assembly further includes a regulating member which is disposed in the water mixing chamber, and which is coupled to be rotatable with the first valve portion, and to be associated with the second valve portion. The regulating member extends in the axial direction and outwardly of the first front inner wall so as to be externally actuated to rotate the first valve portion and to control the second valve portion. A flow direction controlling body includes second front and rear inner walls which face toward and which are spaced apart from each other in the axial direction, and an inner tubular wall which surrounds a second axis oriented in the axial direction, which is interposed between, and which cooperates with the second front and rear inner walls to confine an accommodation cavity. The inner tubular wall has a communicating port which is disposed downstream of and which is communicated with the transit chamber, and which extends in a radial direction relative to the second axis to communicate the transit chamber with the accommodation cavity. The second rear inner wall has first and second outflow ports which are spaced apart from each other and which can respectively communicate with first and second outlets. A secondary valve includes a bottom wall with an annular periphery. The bottom wall is disposed to face toward and is in sliding contact with and rotatable relative to the second rear inner wall between first and second positions. The secondary valve further includes an annular wall which extends from the annular periphery in the axial direction towards the second front inner wall. The annular wall includes proximate and distal portions relative to the bottom wall. The distal portion is in sealing and sliding contact with the inner tubular wall when the bottom wall is rotated relative to the second rear inner wall. The proximate portion has a first passage extending in a radial direction relative to the second axis and communicating with the communicating port. The bottom wall has a second passage which extends therethrough in the axial direction to communicate with the first passage and which further extends angularly about the second axis. As such, when the bottom wall is rotated to the first position, the second passage communicates with the first outflow port. When the bottom wall is moved to the second position, the second passage communicates with the second outflow port. The secondary valve further includes a stem portion which is secured to the distal portion and which extends in the axial direction and outwardly of the second front inner wall so as to be actuated externally to rotate-the-bottom wall.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Referring to FIGS. 3, 4, 5 and 6, the preferred embodiment of the faucet assembly according to the present invention is shown to comprise a faucet body 20, a valve assembly, and a secondary valve 30.

Figure 4:
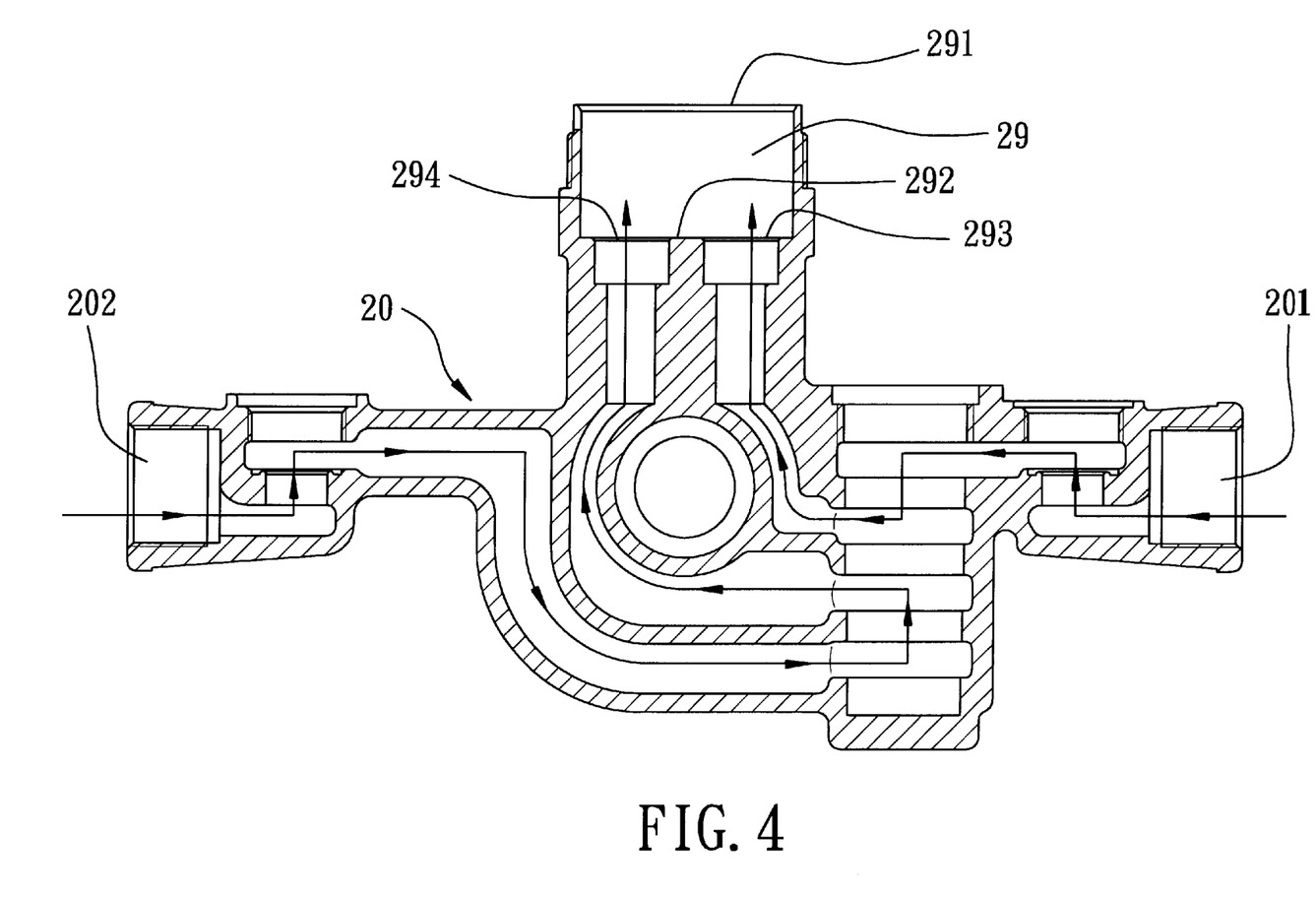
FIG. 4 is a cross-sectional view of a faucet body of the faucet assembly of the preferred embodiment, a valve assembly thereof being removed for the sake of clarity.
Figure 5:
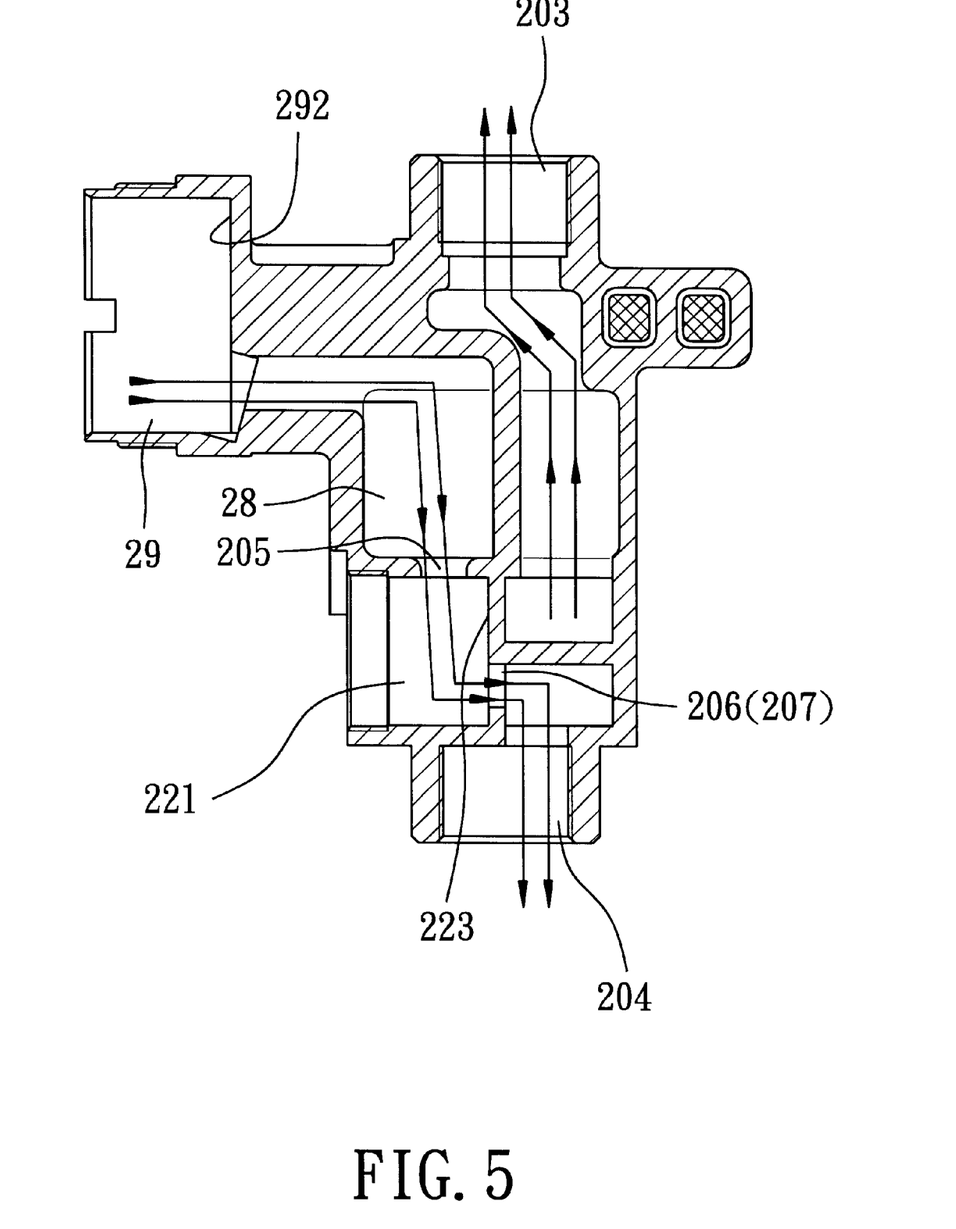
FIG. 5 is a longitudinal sectional view of the faucet body of the faucet assembly, the valve assembly being removed for the sake of clarity.

The faucet body 20 includes a water mixing chamber 29, a transit chamber 28, and a flow direction controlling body 22. The water mixing chamber 29 includes first front and rear inner walls 291,292 which face towards and which are spaced apart from each other in an axial direction to define an accommodating space for receiving water. As shown in FIG. 4, the first rear inner wall 292 has hot and cold water inlets 293,294 which are disposed to introduce hot and cold water flows into the accommodating space, and which are in fluid communication with hot and cold water inflow passages 201,202, respectively. As shown in FIG. 5, the transit chamber 28 is disposed to be in fluid communication with and downstream of the water mixing chamber 29.

The valve assembly is disposed downstream of the mixing chamber 29 and upstream of the transit chamber 28. The valve assembly includes a primary valve 21 and a regulating member 23. The primary valve 21 has a first valve portion (not shown) which is disposed in the water mixing chamber 29 and which is rotatable relative to the first rear inner wall 292 about a first axis oriented in the axial direction to control the flows of hot and cold waters into the water mixing chamber 29 via the hot and cold water inlets 293,294, respectively, and a second valve portion (not shown) which is disposed between the water mixing chamber 29 and the transit chamber 28 to control the flow of mixed water formed in the water mixing chamber 29 into the transit chamber 28. The regulating member 23 is disposed in the water mixing chamber 29, and is coupled to be rotatable with the first valve portion and to be associated with the second valve portion. The regulating member 23 is further disposed to extend in the axial direction and outwardly of the first front inner wall 291 and through a hole 241 in a face plate 24 to engage a handle 25 so as to be externally actuated to rotate the first valve portion and to control the second valve portion in a known manner.

Figure 3:
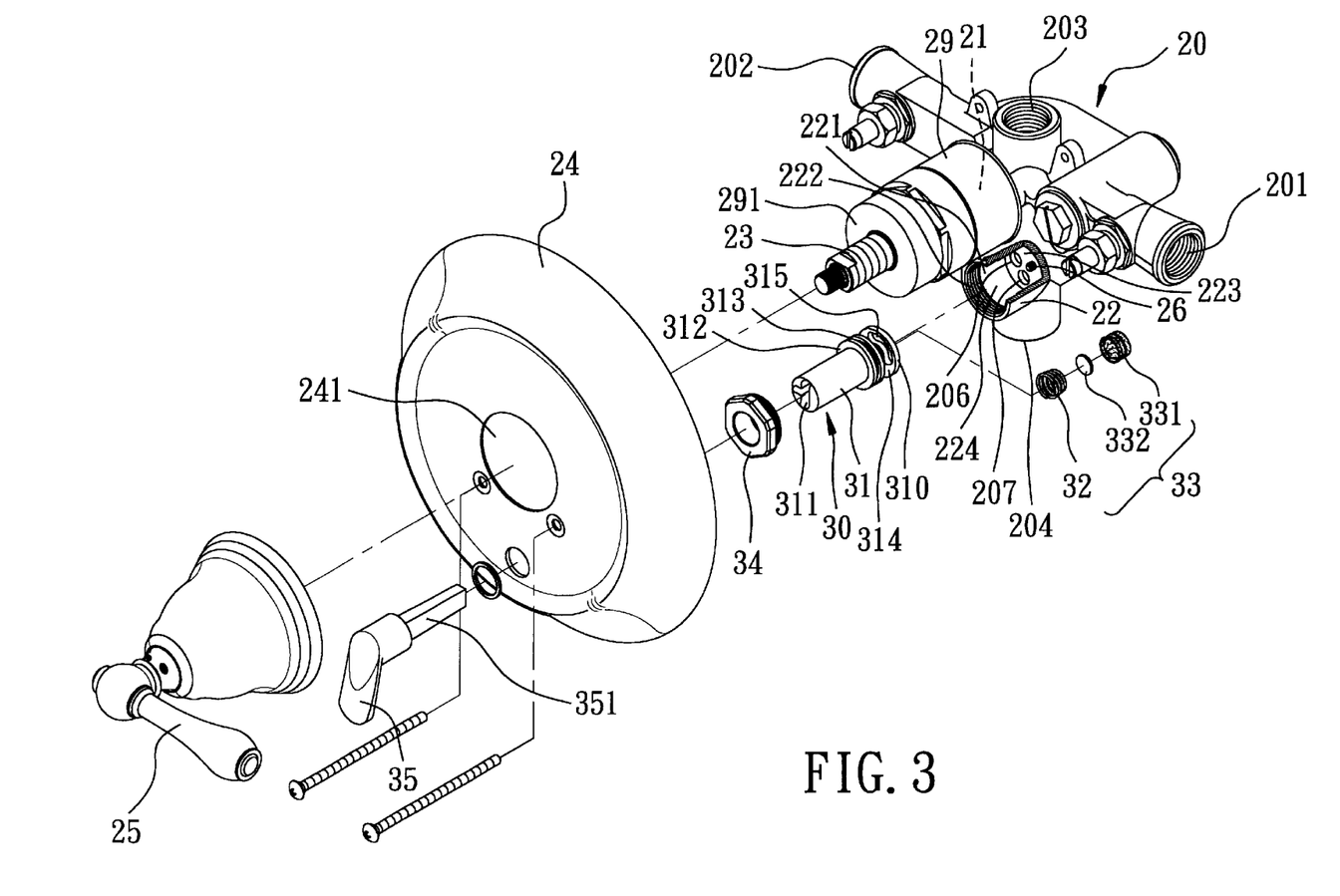
FIG. 3 is an exploded perspective view of a preferred embodiment of a faucet assembly according to this invention.
Figure 6:
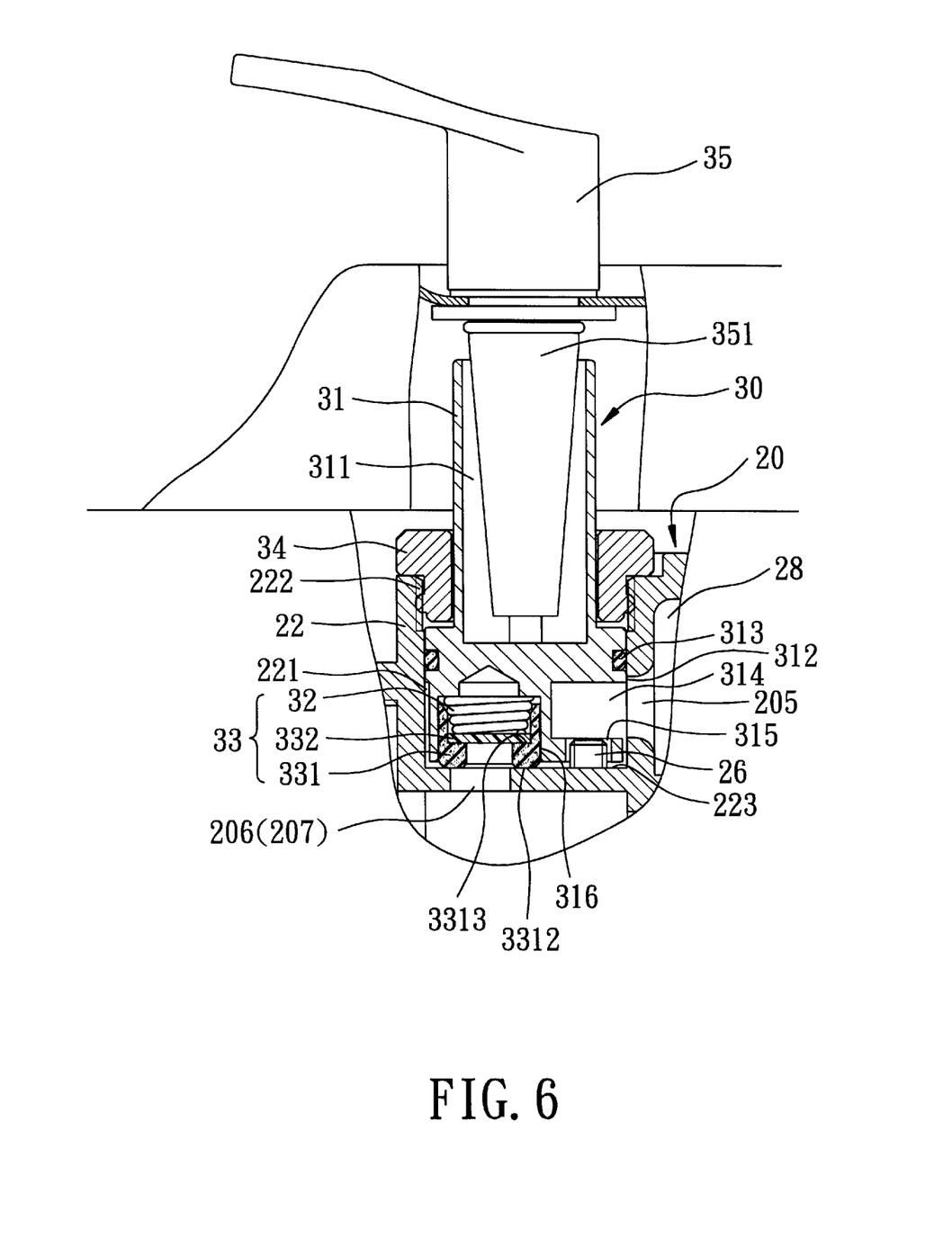
FIG. 6 is a fragmentary, partly sectional schematic view of the preferred embodiment.

As shown in FIGS. 3, 5, and 6, the flow direction controlling body 22 includes second front and rear inner walls 34, 223 which face toward and which are spaced apart from each other in the axial direction, and an inner tubular wall 224 which surrounds a second axis oriented in the axial direction, which is interposed between, and which cooperates with the second front and rear inner walls 34,223 to confine an accommodation cavity 221. The second front inner wall 34 is connected threadedly to an inner threaded portion 222 of the inner tubular wall 224. The inner tubular wall 224 has a communicating port 205 which is disposed downstream of and which is communicated with the transit chamber 28, and which extends in a radial direction relative to the second axis to communicate the transit chamber 28 with the accommodation cavity 221. The second rear inner wall 223 has first and second outflow ports 206,207 which are spaced angularly apart from each other and which communicate respectively with first and second outlets 203,204 so that water can flow out of the latter. In addition, a limiting member 26 is disposed on and extends from the second rear inner wall 223.

Figure 7:
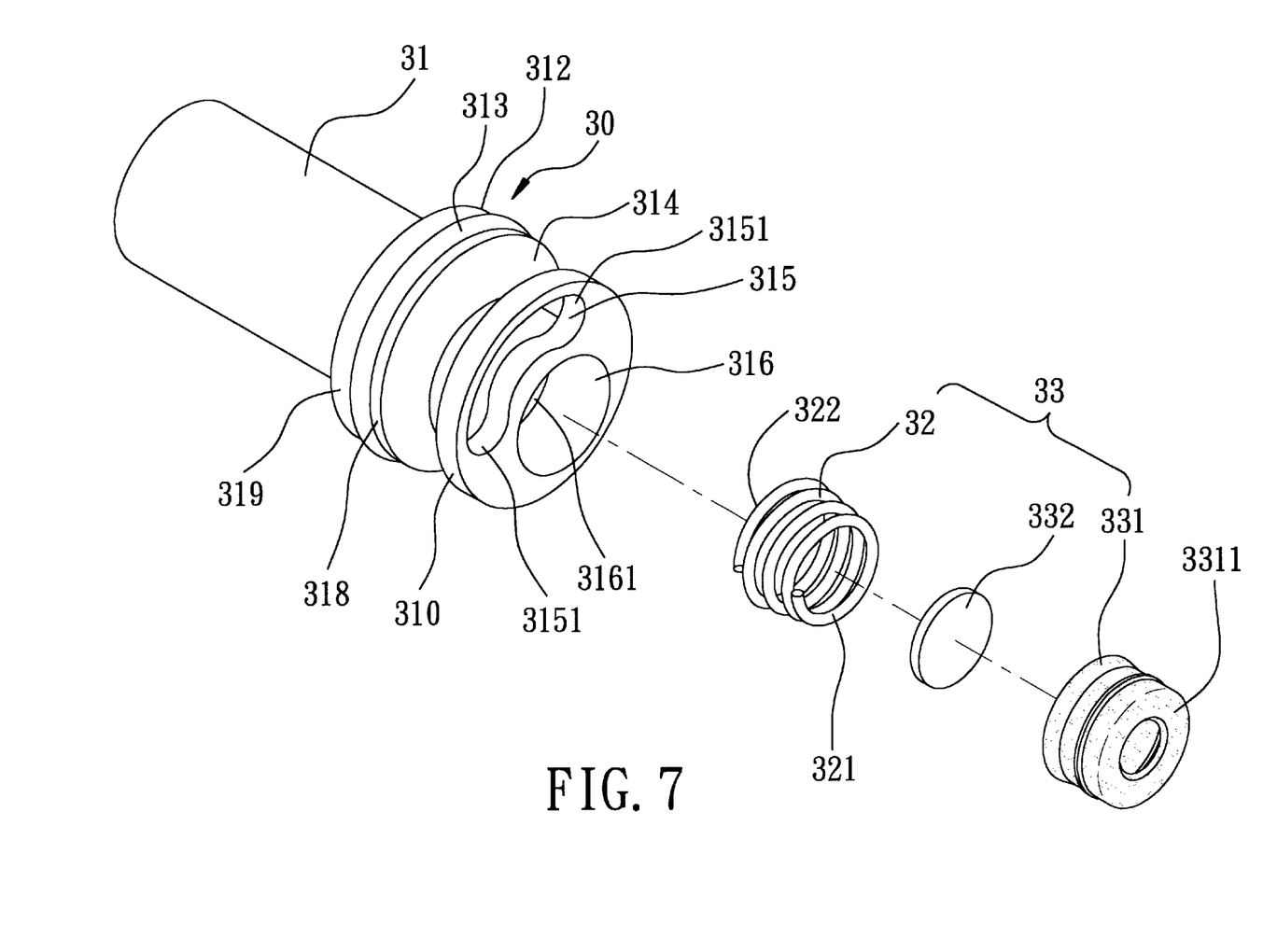
FIG. 7 is an exploded perspective view showing a second valve of the preferred embodiment.

As shown in FIGS. 3, 6, and 7, the secondary valve 30 includes a bottom wall 310 with an annular periphery. The bottom wall 310 is disposed to face toward and in sliding contact with and to be rotatable relative to the second rear inner wall 223 between first and second positions. An annular wall 312 extends from the annular periphery of the bottom wall 310 in the axial direction towards the second front inner wall 34. The annular wall 312 includes proximate and distal portions 318,319 relative to the bottom wall 310. The distal portion 319 is disposed to be in sealing-and sliding contact with the inner tubular wall 224 by means of a seal ring 313 when the bottom wall 310 is rotated relative to the second rear inner wall 223. The proximate portion 318 has an arcuate first passage 314 which is disposed to extend in a radial direction relative to the second axis and to communicate with the communicating port 205. The first passage 314 further extends around the second axis so as to maintain communication with the communication port 205 when the bottom wall 310 is rotated.

The bottom wall 310 has an arcuate second passage 315 which extends through the bottom wall 310 in the axial direction to communicate with the first passage 314 and which further extends angularly about the second axis. The second passage 315 has two limiting ends 3151 which correspond to the first and second positions, respectively. The limiting member 26 is received in the second passage 315 and is movable between the limiting ends 3151. In addition, the bottom wall 310 has an inner peripheral, wall surface which extends forwardly in the axial direction and which terminates at an end wall surface 3161 to confine a recess 316.

The secondary valve 30 further includes a stem portion 31 which is secured to the distal portion 319 and which extends in the axial direction and outwardly of the second front inner wall 34. The stem portion 31 has a T-shaped engaging slot 311 such that a handle 35 with an insert portion 351 is inserted into the engaging slot 311 so as to be in a spline connection with the stem portion 31 and so as to be actuated externally to rotate the bottom wall 310.

The secondary valve 30 further includes a sealing member 33 which is received in the recess 316, and includes an elastomeric member 331, a disc 332, and a biasing member 32. The elastomeric member 331 has an outer abutting end 3311 which frictionally contacts with the second rear inner wall 223. The outer abutting end 3311 is a ring member which has outer and inner wall portions 3312,3313 opposite to each other in the axial direction. The disc 332 is mounted on the inner wall portion 3313. The biasing member 32 is a coil spring with a spring end 321 which abuts against the disc 332, and an opposite spring end 322 which abuts against the end wall surface 3161 so as to bias the outer wall portion 3312 to sealingly engage the second rear inner wall 223 in the axial direction.

Figure 8:
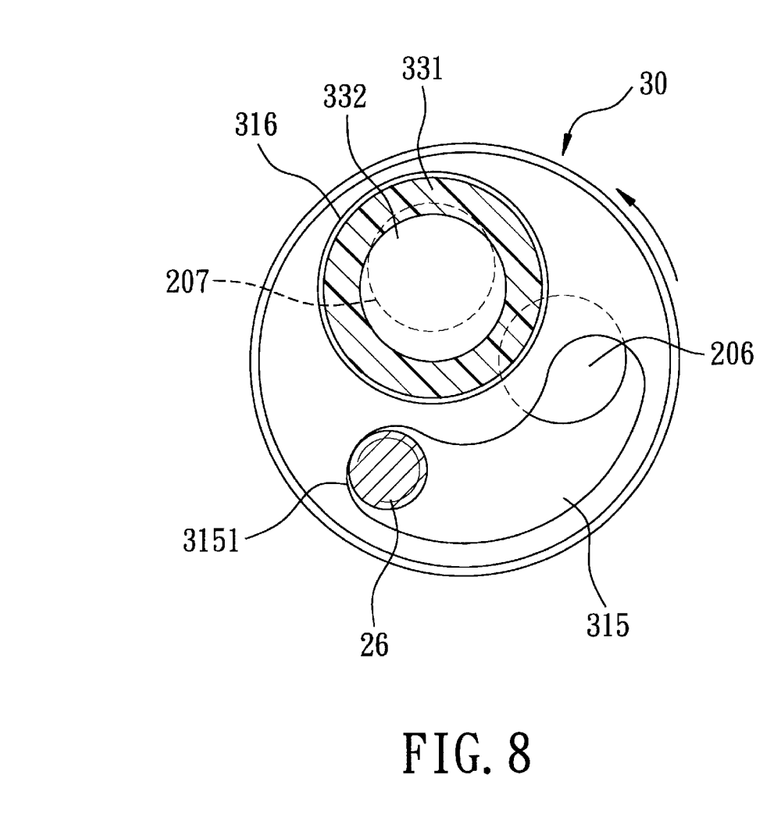
FIGS. 8 and 9 are partly sectional schematic views illustrating the second valve in first and second positions.
Figure 9:
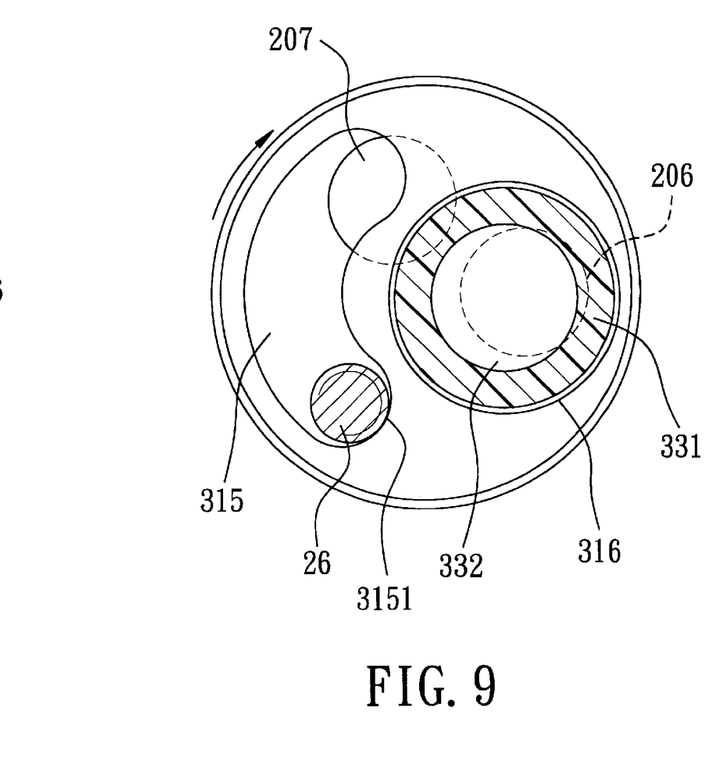

As illustrated, the bottom wall 310 is movable by actuating the handle 35 between the first position, as shown in FIG. 8, where the sealing member 33 seals the second outflow port 207 while the limiting member 26 is limited by one of the limiting ends 3151 of the second passage 315, thereby communicating the second passage 315 with the first outflow port 206 to permit water to flow out from the first outlet 203, and the second position, as shown in FIG. 9, where the sealing member 33 seals the first outflow port 206 while the limiting member 26 is limited by the other one of the limiting ends 3151 of the second passage 315, thereby communicating the second passage 315 with the second outflow port 207 to permit water to flow out from the second outlet 204.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A faucet assembly comprising:

a water mixing chamber including first front and rear inner walls facing towards and spaced apart from each other in an axial direction to define an accommodating space for receiving water, said first rear inner wall having hot and cold water inlets disposed to introduce hot and cold water flows into said accommodating space, and adapted to communicate with hot and cold water inflow passages respectively;

a transit chamber disposed to be in fluid communication with and downstream of said water mixing chamber;

a valve assembly disposed downstream of said mixing chamber and upstream of said transit chamber, and including a primary valve having a first valve portion disposed in said water mixing chamber and rotatable relative to said first rear inner wall about a first axis oriented in the axial direction to control the flows of hot and cold waters into said water mixing chamber via said hot and cold water inlets respectively, and a second valve portion disposed between said water mixing chamber and said transit chamber to control the flow of mixed water formed in said water mixing chamber into said transit chamber, and a regulating member disposed in said water mixing chamber, and coupled to be rotatable with said first valve portion, and to be associated with said second valve portion, said regulating member being further disposed to extend in the axial direction and outwardly of said first front inner wall so as to be externally actuated to rotate said first valve portion and to control said second valve portion;

a flow direction controlling body including second front and rear inner walls which face toward and which are spaced apart from each other in the axial direction, and an inner tubular wall which surrounds a second axis oriented in the axial direction, which is interposed between, and which cooperates with said second front and rear inner walls to confine an accommodation cavity, said inner tubular wall having a communicating port which is disposed downstream of and which is communicated with said transit chamber, and which extends in a radial direction relative to the second axis to communicate said transit chamber with said accommodation cavity, said second rear inner wall having first and second outflow ports which are spaced apart from each other and which are adapted to respectively communicate with first and second outlets; and a secondary valve including a bottom wall with an annular periphery, disposed to face toward and in sliding contact with and rotatable relative to said second rear inner wall between first and second positions, an annular wall extending from said annular periphery in the axial direction towards said second front inner wall, said annular wall including proximate and distal portions relative to said bottom wall, said distal portion being disposed to be in sealing and sliding contact with said inner tubular wall when said bottom wall is rotated relative to said second rear inner wall, said proximate portion having a first passage disposed to extend in a radial direction relative to the second axis and to communicate with said communicating port, said bottom wall having a second passage extending through said bottom wall in the axial direction to communicate with said first passage and further extending angularly about the second axis such that when said bottom wall is rotated to the first position, said second passage communicates with said first outflow port, and when said bottom wall is moved to the second position, said second passage communicates with said second outflow port, and a stem portion disposed to be secured to said distal portion and extending in the axial direction and outwardly of said second front inner wall so as to be actuated externally to rotate said bottom wall.

2. The faucet assembly of claim 1, wherein said first passage extends around the second axis so as to maintain communication with said communicating port when said bottom wall is rotated.

3. The faucet assembly of claim 2, wherein said secondary valve further includes a sealing member mounted on said bottom wall, angularly spaced apart from said second passage relative to the second axis, and extending to sealingly engage said second rear inner wall such that said sealing member seals one of said first and second outflow ports when said bottom-wall is in a corresponding one of the first and second positions.

4. The faucet assembly of claim 3, wherein said bottom wall has an inner peripheral wall surface extending in the axial direction toward said stem portion and terminating at an end wall surface to confine a recess, said sealing member including an elastomeric member which is received in said recess and which has an outer abutting end frictionally contacting with said second rear inner wall, and a biasing member which is disposed between said elastomeric member and said end wall surface and which biases said elastomeric member toward said second rear inner wall-in the axial direction.

5. The faucet assembly of claim 4, wherein said outer abutting end of said elastomeric portion is a ring member which has outer and inner wall portions opposite to each other in the axial direction, said biasing member being a coil spring with a spring end which abuts against said inner wall portion and which biases said outer wall portion to engage said second rear inner wall.

6. The faucet assembly of claim 5, wherein said sealing member further including a disc mounted between said spring end and said inner wall portion.

7. The faucet assembly of claim 1, wherein said second passage has two limiting ends corresponding to the first and second positions, respectively, said faucet assembly further comprising a limiting member disposed on and extending from said second rear inner wall to be received in said second passage so as to be movable between said limiting ends.

* * * * *